(12) United States Patent
Lombardo et al.

(10) Patent No.: US 12,128,481 B2
(45) Date of Patent: Oct. 29, 2024

(54) SYSTEMS AND METHODS FOR REMOVING BUILD MATERIAL FROM ADDITIVELY MANUFACTURED PARTS

(71) Applicant: General Electric Company, Schenectady, NY (US)

(72) Inventors: Dale Robert Lombardo, Clifton Park, NY (US); Andrew Lee Trimmer, Niskayuna, NY (US); Mohamed Rahmane, Ballston Lake, NY (US)

(73) Assignee: General Electric Company, Evendale, OH (US)

( * ) Notice: Subject to any disclaimer, the term of this patent is extended or adjusted under 35 U.S.C. 154(b) by 8 days.

(21) Appl. No.: 17/714,621

(22) Filed: Apr. 6, 2022

(65) Prior Publication Data

US 2022/0226896 A1  Jul. 21, 2022

Related U.S. Application Data

(62) Division of application No. 15/860,890, filed on Jan. 3, 2018, now abandoned.

(51) Int. Cl.
*B22F 5/10* (2006.01)
*B22F 3/24* (2006.01)
(Continued)

(52) U.S. Cl.
CPC .................. *B22F 5/10* (2013.01); *B22F 3/24* (2013.01); *B22F 10/68* (2021.01); *B29C 64/153* (2017.08);
(Continued)

(58) Field of Classification Search
CPC .... B22F 5/10; B22F 3/24; B22F 10/68; B22F 10/28; B22F 10/36; B22F 12/41;
(Continued)

(56) References Cited

U.S. PATENT DOCUMENTS 9,254,535 B2    2/2016 Buller et al.
2015/0034123 A1    2/2015 Pressacco et al.
(Continued)

FOREIGN PATENT DOCUMENTS

CN    105170988 A1    12/2015
CN    204975339 A1    1/2016
(Continued)

OTHER PUBLICATIONS

European Search Report Corresponding to EP18211650 on May 24, 2019.
(Continued)

*Primary Examiner* — Adil A. Siddiqui
(74) *Attorney, Agent, or Firm* — Dority & Manning, P.A.

(57) ABSTRACT

A component formed using an additive manufacturing system, the component includes an exterior surface, an interior cavity, at least one powder removal device disposed within the interior cavity and adjacent to the exterior surface, wherein the at least one powder removal device is configured to remove un-sintered and partially sintered powder from the component; and at least one exit port defined in the exterior surface to facilitate egress of the un-sintered and partially sintered powder out of the component.

18 Claims, 8 Drawing Sheets

(51) Int. Cl.
*B22F 10/28* (2021.01)
*B22F 10/36* (2021.01)
*B22F 10/68* (2021.01)
*B22F 12/41* (2021.01)
*B22F 12/49* (2021.01)
*B29C 64/153* (2017.01)
*B29C 64/35* (2017.01)
*B29C 64/386* (2017.01)
*B33Y 10/00* (2015.01)
*B33Y 30/00* (2015.01)
*B33Y 40/20* (2020.01)
*B33Y 50/00* (2015.01)
*B33Y 80/00* (2015.01)

(52) U.S. Cl.
CPC ............ *B29C 64/35* (2017.08); *B29C 64/386* (2017.08); *B33Y 10/00* (2014.12); *B33Y 40/20* (2020.01); *B33Y 50/00* (2014.12); *B33Y 80/00* (2014.12); *B22F 2003/247* (2013.01); *B22F 10/28* (2021.01); *B22F 10/36* (2021.01); *B22F 12/41* (2021.01); *B22F 12/49* (2021.01); *B22F 2202/01* (2013.01); *B33Y 30/00* (2014.12)

(58) Field of Classification Search
CPC ............... B22F 12/49; B22F 2003/247; B22F 2202/01; B22F 10/00; B29C 64/153; B29C 64/35; B29C 64/386; B29C 64/20; B29C 64/205; B29C 64/264; B29C 64/30; B29C 64/393; B33Y 10/00; B33Y 40/20; B33Y 50/00; B33Y 80/00; B33Y 30/00; B33Y 50/02; Y02P 10/25
See application file for complete search history.

(56) References Cited

U.S. PATENT DOCUMENTS

| | | |
|---|---|---|
| 2016/0074940 A1 | 3/2016 | Cote et al. |
| 2016/0136759 A1 | 5/2016 | Broda |
| 2016/0271697 A1 | 9/2016 | Karlen et al. |
| 2016/0356162 A1 | 12/2016 | Jones et al. |
| 2017/0080496 A1 | 3/2017 | Karlen et al. |
| 2017/0095888 A1* | 4/2017 | Butcher ................ B22F 5/009 |
| 2017/0113253 A1 | 4/2017 | Giulietti et al. |
| 2017/0144226 A1 | 5/2017 | Giulietti et al. |
| 2017/0144382 A1 | 5/2017 | Ott et al. |
| 2017/0157857 A1 | 6/2017 | Butcher et al. |
| 2017/0197284 A1 | 7/2017 | Twelves, Jr. et al. |
| 2017/0197362 A1 | 7/2017 | Butcher et al. |
| 2017/0197364 A1* | 7/2017 | Butcher ................ B26D 1/553 |
| 2017/0216921 A1 | 8/2017 | Oswald et al. |
| 2017/0217094 A1 | 8/2017 | Oswald et al. |
| 2019/0126351 A1* | 5/2019 | Geisen .................. B33Y 40/20 |
| 2020/0094326 A1* | 3/2020 | Oswald ................. B33Y 40/20 |

FOREIGN PATENT DOCUMENTS

| | | |
|---|---|---|
| EP | 3257660 A1 | 12/2017 |
| GB | 2517490 A | 2/2015 |
| KR | 101591438 B1 | 2/2016 |

OTHER PUBLICATIONS

Gaytan et al., Advanced Metal Powder Based Manufacturing of Complex Components by Electron Beam Melting, Materials Technology, vol. 24, Issue 3, 2009, pp. 180-190.

Hasib et al., Powder Removal from Ti-6A1-4V Cellular Structures Fabricated via Electron Beam Melting, Journal of the Minerals, vol. 67, Issue 3, Mar. 2015, pp. 639-646.

Mitchell et al., Cleaning and Cleanliness Measurement of Additive Manufactured Parts, National Space & Missile Materials Symposium, Jun. 20-24, 2016.

Seiffert G et al., Comparison of High-Intensity Sound and Mechanical Vibration for Cleaning Porous Titanium Cylinders Fabricated Using Selective Laser Melting, Journal of Biomedical Materials Research, vol. 105, Issue 1, 2017, pp. 117-123.

Tramel et al., Cleaning Process Development for Metallic Additively Manufactured Parts, NASA, Sep. 3-5, 2014.

Verhaagen et al., Ultrasonic Cleaning of 3D Printed Objects and Cleaning Challenge Devices, Applied Acoustics, vol. 103, pp. 172-181, Feb. 2016.

* cited by examiner

SYSTEMS AND METHODS FOR REMOVING BUILD MATERIAL FROM ADDITIVELY MANUFACTURED PARTS

CROSS-REFERENCE TO RELATED APPLICATIONS

This application is a divisional application of U.S. application Ser. No. 15/860,890 filed Jan. 3, 2018, which is hereby incorporated by reference in its entirety.

BACKGROUND

The field of the disclosure relates to generally to additive manufacturing, and more specifically to a method of removing build material from additively manufactured parts.

At least some known components or parts manufactured using additive manufacturing techniques, such as electron beam additive printing, include deposits of both un-sintered and partially sintered powder that remains within a build layer after the build layer has been created. The manufactured components must be cleaned to remove the remaining un-sintered and partially sintered powder.

Known additive manufacturing processes, specifically Electron Beam Melting (EBM), are known to result in residual amounts of powdered printing medium being left behind within the manufactured components. EBM printing is relatively quick, but requires creation of partially sintered material during the process to manage 'smoking' and to provide continuity of the EBM printed solid part and the machine. 'Smoking' is the ejection of powder from the powder bed due to the build-up of local electrical charges and repulsive electrostatic forces. This results in loose powder being displaced from the powder bed. The un-sintered and partially sintered powders that are a product of the process are relatively difficult to extract from internal cavities, thus limiting the applicability of EBM printing to relatively simple shapes. Users of EBM printing benefit from the increased build speed of the process, however, due to the difficulty in evacuating un-sintered and partially sintered powders from within printed components, the designs and complexity of manufactured components are constrained by the geometry of internal cavities and shapes. Removal of the un-sintered and partially sintered powders can be accomplished using a variety of known techniques, each with its respective drawbacks and costs. Un-sintered and partially sintered powder can be removed using, for example; suction, a blower, vibration, a fluid or a solvent, and/or an external tool.

During the EBM printing process, powder is sintered together to form the component. After the process is completed, both un-sintered and partially sintered powder remain within the internal cavities and in the vicinity of the exterior surface of printed parts. The un-sintered and partially sintered powder must be broken apart and removed from the printed parts Removing un-sintered and partially sintered powder from the printed part requires the implementation of one of any number of costly, time consuming, and laborious processes. For example, current methods to remove powder are strictly in the post-processing phase of manufacturing. Current processes for removing residual powder from a component manufactured using additive manufacture include, but are not limited to: water pumping, slurry pumping, using water jets, chemically assisted ultrasonic testing, chemical dipping, etc. These existing methods are focused around and utilize suction and compressed air nozzles, ultrasonic vibration, and solvents or other fluids for powder removal, and are not effective when removing residual un-sintered powder from a printed part.

BRIEF DESCRIPTION

In one aspect, a component formed using an additive manufacturing system is provided. The component formed using an additive manufacturing system, the component includes an exterior surface, an interior cavity, at least one powder removal device disposed within the interior cavity and adjacent to the exterior surface, wherein the at least one powder removal device is configured to remove un-sintered and partially sintered powder from the component, and at least one exit port defined in the exterior surface to facilitate egress of the un-sintered and partially sintered powder out of the component.

In another aspect, a method for forming a component from a powdered build material is provided. The method includes creating a model of the component, creating a model of at least one powder removal device, integrating the model of the at least one powder removal device into the model of the component, inputting the model of the component into the additive manufacturing system, and operating the additive manufacturing system to build the component including the at least one powder removal device, wherein the at least one powder removal device is configured to remove un-sintered and partially sintered material from the component when the at least one powder removal device is excited.

In yet another aspect, a method for removing un-sintered and partially sintered powder from an additively manufactured part is provided. The method includes fabricating, using an additive manufacturing process, a component including at least one powder removal device, exciting the component to cause the at least one powder removal device to remove un-sintered and partially sintered powder from the component.

DETAILED DESCRIPTION

Figure 1:
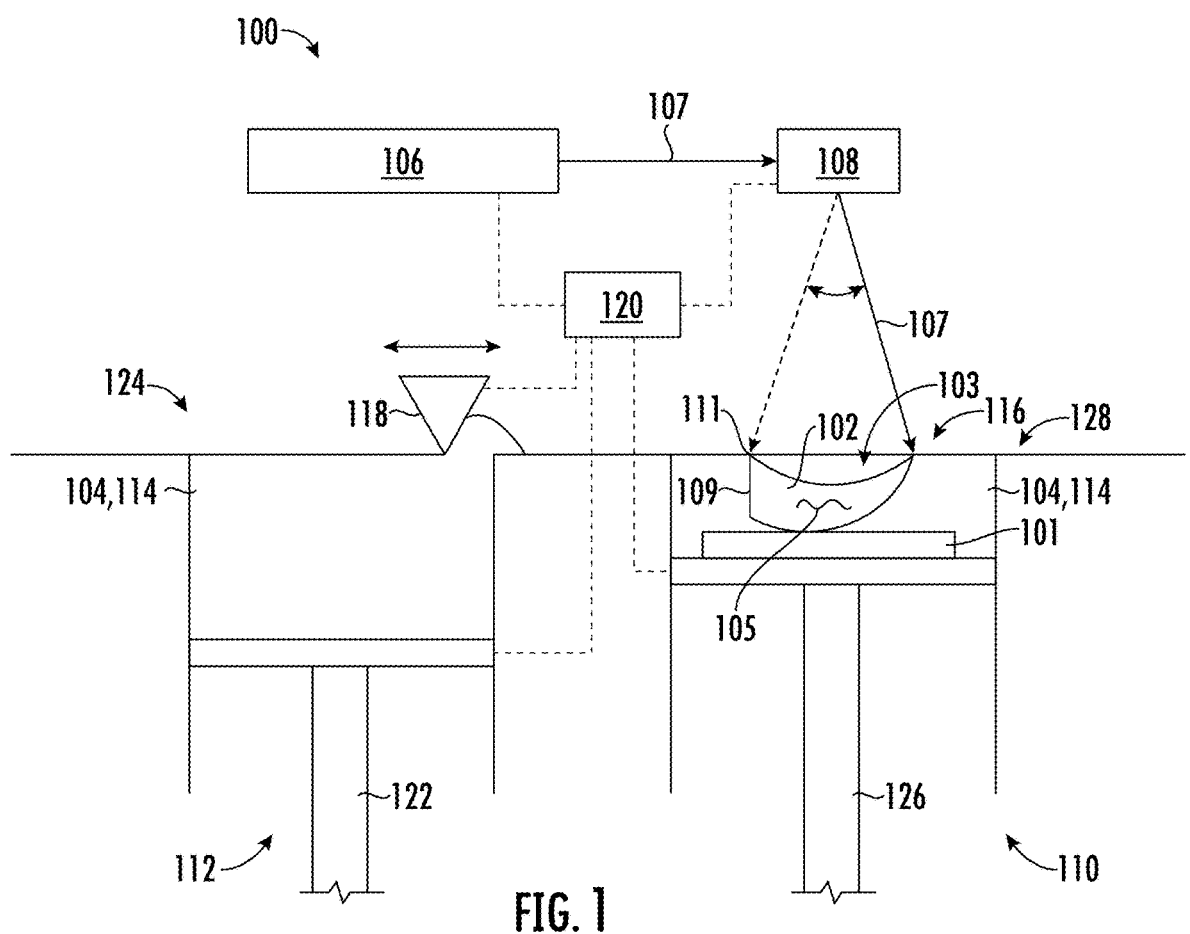
FIG. 1 is a schematic view of an exemplary additive manufacturing system.

The methods and systems described herein overcome at least some disadvantages of known methods for removing un-sintered and partially sintered powder from components printed using additive manufacturing techniques. More specifically, the methods and systems described herein enable additive manufacture of a component that includes built-in powder removal tools referred to herein as powder removal devices. Additionally or alternatively, the methods and systems enable additive manufacture of a component that is characterized by an as-printed part that contains powder removal devices which, when excited, facilitate the removal of un-sintered and partially sintered powder that is generated during the additive manufacturing process. Moreover, in some embodiments, the post build processing of the component is performed at least partially within a vibratory bowl or other structure capable of moving the component to excite the powder removal devices within the component to facilitate removal of the un-sintered and partially sintered powder.

This method takes advantage of the additive manufacturing process by integrating a powder removal tool into the manufacture of the printed part by creating internal structures manufactured within the desired component during the printing process. When mechanically agitated, i.e., when excited by a vibratory tool such as a laboratory table or bowl, the internal structures break apart the powder surrounding them, and exit the part through an exit port. Accordingly, this method provides a cost effective approach to evacuating residual powder that remains after the printing process. This method will economically increase the component design space that is available to users utilizing EBM machines. Additionally, this method can be applied to a wide range of designs, subsequently expanding the applicability and usefulness of high speed EBM printing by increasing the variety of parts that an EBM machine is capable of printing. Further the present methods can be applied to any additive manufacturing method, not just EBM, to facilitate clearing un-sintered and partially sintered powder at a relatively low cost. Additionally, this method provides a cost effective way of removing un-sintered powder from the internal cavities and external surfaces of a printed part in a cost effective manner that does not require doesn't require external processes (i.e., abrasive blasting, pneumatics, or mechanical picking).

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

With reference to FIG. 1, in the exemplary embodiment, additive manufacturing system 100 is an Electron Beam Melting (EBM) system. In alternative embodiments, additive manufacturing system 100 is any other suitable additive manufacturing system, including, without limitation, one of a Direct Metal Laser Sintering (DMLS) system, Direct Metal Laser Melting (DMLM) system, a Selective Laser Sintering (SLS) system, a Direct Metal Laser Deposition (DMLD) system, a Direct Metal Laser Deposition (DMLD) system, and a LaserCusing® system. In the exemplary embodiment, additive manufacturing system 100 includes a build fixture 110, a build plate 101 oriented within build fixture 110 and configured to support component 102, an electron beam system 106 configured to generate an electron beam 107, a scanner system 108 configured to selectively direct electron beam 107 across build fixture 110 at a preselected scan speed, a powder delivery system 112, a powder coater 118, and a controller 120.

In the exemplary embodiment, powder coater 118 is movable, upon instruction by controller 120, to transfer material 104 in powdered form 114 from powder delivery system 112 to build fixture 110. For example, in the exemplary embodiment, powder delivery system 112 includes a piston 122 operable, upon instruction by controller 120, to raise a selected thickness of material 104 in powdered form 114 above an edge 124 of powder delivery system 112, and powder coater 118 is sweepable along edge 124 to capture the selected thickness of material 104 in powdered form 114 and deliver it to build fixture 110. Powder coater 118 is further operable to deposit the captured material 104 in powdered form 114 atop build fixture 110 as a build layer 116. Moreover, build fixture 110 is operable, upon instruction by controller 120, to reposition build plate 101 to receive build layer 116 atop previously deposited layers of material 104. For example, in the exemplary embodiment, build fixture 110 includes a piston 126 operable, upon instruction by controller 120, to lower build plate 101 a preselected distance below an edge 128 of build fixture 110 to accommodate receipt of build layer 116 from powder coater 118. In alternative embodiments, additive manufacturing system 100 is configured to deposit material 104 in powdered form 114 onto build layer 116 in any manner that enables component 102 to be formed as described herein.

In the exemplary embodiment, electron beam system 106 is configured, upon instruction by controller 120, to generate electron beam 107 having a preselected energy sufficient to at least partially melt material 104 in powdered form 114 at preselected regions of build layer 116, such that the preselected regions fuse with material 104 in a layer immediately below build layer 116. In the exemplary embodiment, electron beam system 106 includes a yttrium-based solid state laser. In alternative embodiments, electron beam system 106 includes any suitable source for electron beam 107 that enables component 102 to be formed as described herein. Additionally, although additive manufacturing system 100 is described as including a single electron beam system 106, it should be understood that additive manufacturing system 100 may include more than one electron beam system 106. In some embodiments, for example, additive manufacturing system 100 includes a first electron beam system 106 having a first power and a second electron beam system 106 having a second power different from the first power. In other embodiments, additive manufacturing system 100 includes any combination of electron beam systems 106 each having any suitable power that enables component 102 to be formed as described herein.

In the exemplary embodiment, scanner system 108 is configured, upon instruction by controller 120, to selectively direct electron beam 107 to preselected regions of build layer 116 that correspond to portions of component 102, such that the preselected regions fuse with material 104 in a layer immediately below build layer 116. For example, scanner system 108 includes a suitable sensor, such as at least one of a two-dimension (2D) scan galvanometer, a three-dimension (3D) scan galvanometer, and a dynamic focusing scan galvanometer (not shown), to determine a position and orientation of build layer 116 with respect to electron beam 107. In alternative embodiments, scanner system 108 is configured to selectively direct electron beam 107 to the preselected regions of build layer 116 in any suitable fashion that enables additive manufacturing system 100 to function as described herein.

Controller 120 is operably coupled to each of build fixture 110, electron beam system 106, scanner system 108, powder delivery system 112, and powder coater 118 to implement additive manufacturing system 100 as a computer numerically controlled (CNC) machine. In the exemplary embodiment, to form component 102, controller 120 receives a computer design model of component 102 and generates a build file in which the computer design model is "sliced" into a series of thin, parallel planes, such that a distribution of material 104 within each plane is defined. Controller 120 then provides command signals to, and receives feedback from, build fixture 110, electron beam system 106, scanner system 108, powder delivery system 112, and powder coater 118 as necessary to deposit and fuse successive layers of material 104 in accordance with the model slices to form component 102. For example, controller 120 is configured to control build fixture 110, powder delivery system 112, and powder coater 118 to provide material 104 in powdered form 114 for each successive build layer 116, and to control the power output of electron beam system 106 and the position, movement, and scan speed of scanner system 108, such that electron beam 107 follows a predetermined path along each build layer 116, such that material 104 is selectively fused to form each layer of component 102 having a fused layer thickness in accordance with the build file.

In the exemplary embodiment, component 102 as formed includes an exterior surface 103, an interior cavity 105, at least one powder removal device 109 disposed within interior cavity 105 and adjacent to exterior surface 103, wherein the at least one powder removal device 109 is configured to remove un-sintered and partially sintered powder 114 from component 102 when the at least one powder removal device 109 is excited, and at least one exit port 11 defined in exterior surface 103 to facilitate egress of un-sintered and partially sintered powder 114 out of component 102. In the exemplary embodiment, powder removal devices 109 are configured to remove un-sintered and partially sintered powder 114 from within build layers 116 of component 102 through exit port 111, which can be one of a preexisting design feature in component 102 and a feature added to the model for component 102 prior to manufacture that facilitates exit of powder removal devices 109, un-sintered and partially sintered powders 114 from within component 102

In the exemplary embodiment, powder removal devices 109 have customizable geometry, such that they can be shaped in any form suitable to facilitate removing un-sintered and partially sintered powder from within component 102. Additionally, powder removal devices 109 are sized such that powder removal devices 109 are capable of exiting component 102 through at least one exit port 111. Powder removal devices 109 may have an asymetric or symmetric geometry. In the exemplary embodiment, powder removal devices 109 are manufactured within build layers 116 of component 102 during the additive manufacturing process. Additionally, powder removal devices 109 are separate from component 102 and not attached to component 102 in the exemplary embodiment. Alternatively, powder removal devices 109 may be tethered to an adjacent surface of component 102 (e.g., by a relatively thin piece of material), such that powder removal devices 109 detach from component 102 when vibrated. In the exemplary embodiment, powder removal devices 109 have a size between and including approximately 40 microns and approximately 100 microns. Further, in some embodiments powder removal devices 109 include a plurality of powder removal devices 109 arranged in relation to one another such that powder removal devices 109 interact with one another to facilitate breaking up un-sintered and partially sintered powder 114 when powder removal devices 109 are excited (e.g. by vibrational means, such as vibratory bowl 600 (shown in FIG. 6)).

In the exemplary embodiment, controller 120 is implemented using one or more electronic computing devices. Such devices typically include at least one processing device (not shown) such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a non-transitory storage device and/or a memory device coupled to the at least one processor. Such instructions, when executed by the controller or processing device, cause the controller or processing device to perform at least some of the method steps described herein. Although controller 120 is illustrated as a discrete system, controller 120 may be implemented at least partially by at least one processor embedded within any of build fixture 110, electron beam system 106, scanner system 108, powder delivery system 112, and powder coater 118, and any other suitable computing devices. The above examples are exemplary only, and thus are not intended to limit in any way the definition and/or meaning of the terms controller and processing device.

As noted above, geometric characteristics of components built using typical additive manufacturing processes may be limited. In particular, components built using EBM printing may be constrained by the amount of un-sintered and partially sintered powder present within the interior cavities 105, or existing on the exterior surfaces 103 of such components. However, in some embodiments, additive manufacturing system 100 as described herein is configured to produce a component 102 and powder removal devices 109 positioned within component 102, such that component 102 requires only a post processing excitation, such as a vibratory procedure performed after removal from build plate 101 to remove the un-sintered and partially sintered powder 114 from component 102 using powder removal devices 109.

For example, in certain embodiments, controller 120 is configured to operate at least electron beam system 106 and scanner system 108 using preselected operating parameters that result in the creation of powder removal devices 109 having the required size to facilitate excitation of surrounding particles of un-sintered and partially sintered powder 114. Thus, powder removal devices 109 are capable of breaking apart un-sintered and partially sintered powder 114 within cavities and on surfaces of component 102. For example, in one embodiment, the preselected operating parameters may include a power of electron beam 107 generated by electron beam system 106 in a range from about 100 watts to about 2,000 watts, and a scan speed of scanner system 108 in a range of from about 50 millimeters per second to about 2,000 millimeters per second, such that a thickness of each fused build layer 116 of component 102 is in a range from about 10 micrometers to about 1,000 micrometers, and the size of each powder removal device 109 is in a range from about 20 micrometers to about 3000 micrometers.

In the exemplary embodiment, the preselected operating parameters result in generating a component 102 and powder removal devices 109 that can be removed from build plate 101, and excited such that un-sintered and partially sintered powder 114 is broken apart and dislodged by powder removal devices 109 and is subsequently expunged from component 102. The inclusion of powder removal devices 109 and the subsequent excitation of powder removal devices 109 enables the manufacture of more complex geometries of component 102, and reduces the time and cost required to remove un-sintered powder 114 from component 102, as compared to builds using typical operating parameters and powder removal tools.

Figure 2:
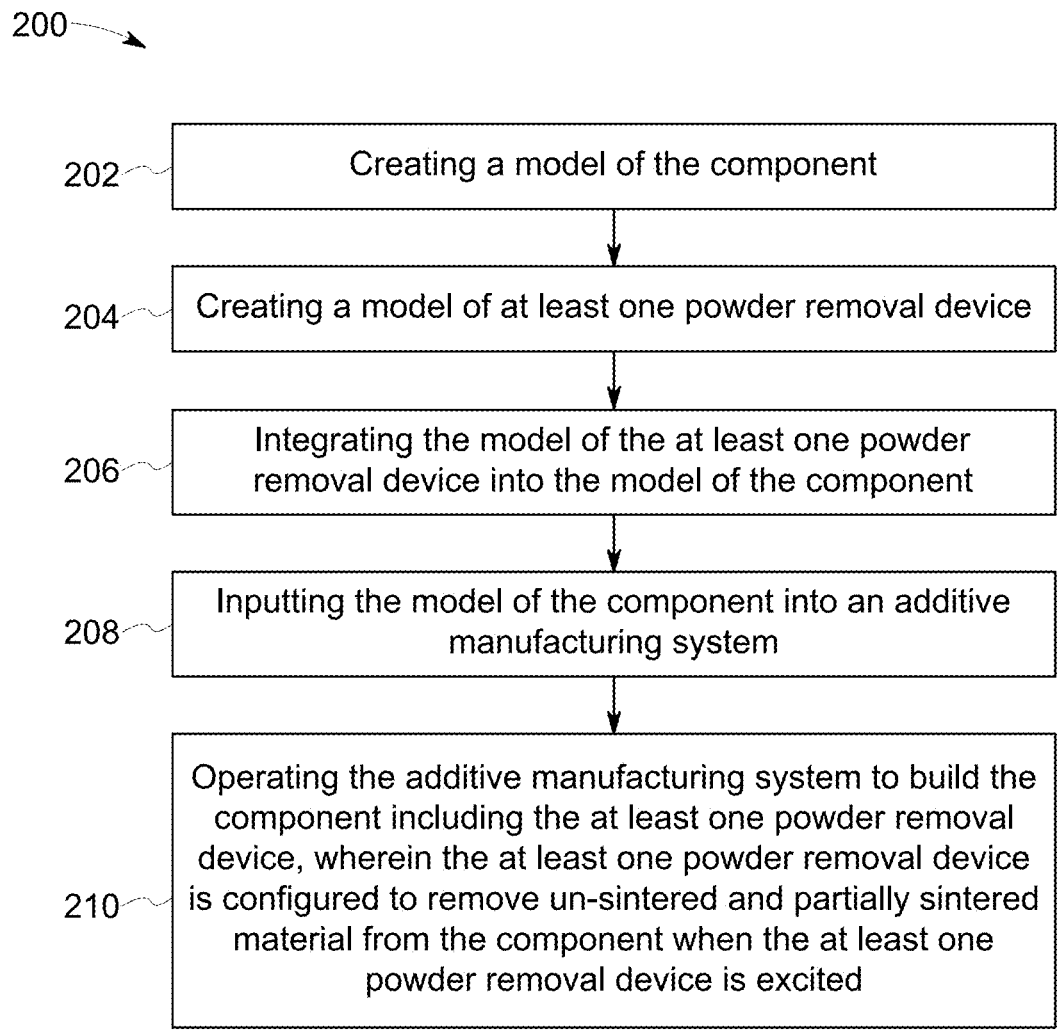
FIG. 2 is a flow diagram of a method for manufacturing a component containing powder removal devices and using an additive manufacturing system such as the manufacturing system of FIG. 1.

FIG. 2 is a flow diagram of a method 200 for manufacturing a component, such as component 102 (shown in FIG. 1) containing powder removal devices, such as powder removal devices 109 (shown in FIG. 1) and using an additive manufacturing system, such as EBM system 100. With reference to FIG. 2, in the exemplary embodiment, method 200 includes creating 202 a model of the component such as component 102, creating 204 a model of at least one powder removal device, such as powder removal device 109, integrating 206 the model of the at least one powder removal device 109 into the model of the component 102, inputting 208 the model of the component into an additive manufacturing system, such as additive manufacturing system 100, and operating 210 the additive manufacturing system 100 to build the component 102 including the at least one powder removal device 109, wherein the at least one powder removal device 109 is configured to remove un-sintered and partially sintered material, such as un-sintered and partially sintered powder 114 from component 102 when the at least one powder removal device 109 is excited.

Additive manufacturing system 100 may be operated such that there is a beam diameter in a range from about 10 micrometers to about 1,000 micrometers. Further, additive manufacturing system 100 may be operated such that there is a particle size in a range from about 10 micrometers to about 1,000 micrometers. Powder removal devices 109 have a size that is equivalent to approximately the size of two to three particles melded together. Further, powder removal device 109 may be tethered to an adjacent surface of component 102, such that powder removal devices 109 is configured to detach the adjacent surface when vibrated. In the exemplary embodiment, powder removal device 109 is unattached to component 102.

Figure 3:
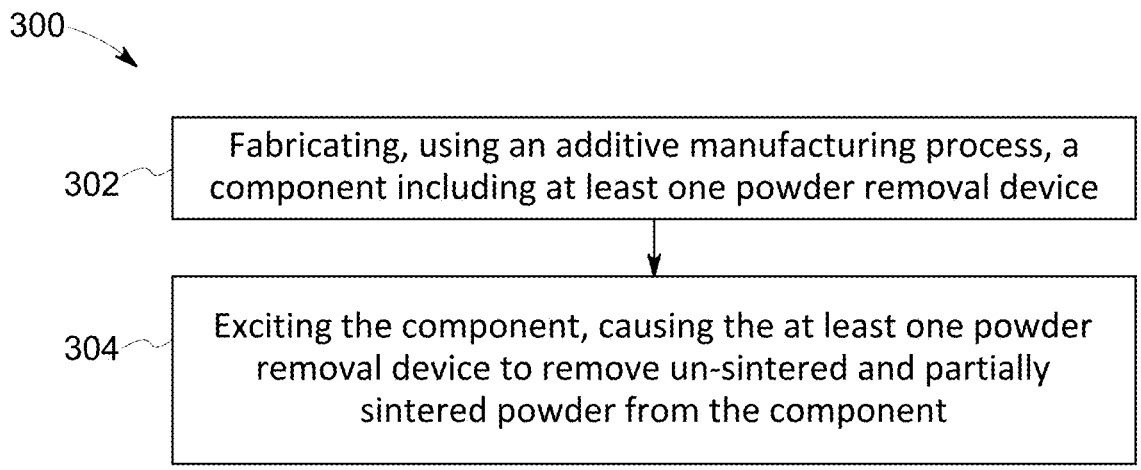
FIG. 3 is a flow diagram of a method for removing powder from a manufactured component.

FIG. 3 is a flow diagram of a method 300 for removing powder, such as un-sintered and partially sintered powder 114 (shown in FIG. 1) from an additively manufactured part, such as component 102. With reference to FIG. 3, in the exemplary embodiment, method 300 includes fabricating 302, using an additive manufacturing process, a component 102 including at least one powder removal device 109. Method 300 further includes exciting 304 component 102, causing the at least one powder removal device 109 to remove un-sintered and partially sintered powder 114 from component 102.

In the exemplary embodiment, exciting 304 is performed such that component 102 (shown in FIG. 1) is vibrated at a rate in a range from about 40 hertz to about 70 hertz. Additionally, in the exemplary embodiment, exciting 304 is performed such that component 102 is vibrated at a vibration amplitude having an acceleration in a range from about 29.4 meters per second squared (m/s$^2$) to about 39.2 m/s$^2$. Additionally, in the exemplary embodiment, exciting 304 is performed such that component 102 is vibrated at a vibration amplitude having a displacement in a range from about 0.0254 millimeters (mm) to about 0.127 mm. Further, in the exemplary embodiment, exciting 304 is performed such that component 102 is excited such that a structural integrity component 102 is not compromised. Additionally or alternatively, exciting 304 component 102 includes vibrating 306 component 102 at a resonance frequency of component 102.

FIGS. 4A-4F are perspective views of alternative exemplary powder removal devices, such as powder removal device 109 manufactured using an additive manufacturing system, such as additive manufacturing system 100. With reference to FIGS. 4A-4F, powder removal devices 109 (shown in FIG. 1) may have a variety of geometric shapes. The shape of powder removal devices 109 may vary depending on the feature of the component 102 (shown in FIG. 1) being printed. For example, if the general shape of component 102 is complicated and contains intricate features or internal passages, the shape of powder removal devices 109 may be designed to facilitate removing un-sintered and partially sintered powder 114 given the geometric constraints of any features or internal passages of component 102. Additionally, if the general shape of component 102 is less complicated, the shape of powder removal devices 109 may be less critical. Further, if component 102 includes a series of tubes, or connected parts, various shapes may be strategically employed to insure the removal and exit of un-sintered and partially sintered powder 114 (shown in FIG. 1) and powder removal devices 109 from component 102. Additionally, powder removal devices 109 may have symmetrical or asymmetrical shapes and features. Powder removal devices 109 with both asymmetrical and symmetrical features are effective at removing un-sintered and partially sintered powder 114 from within component 102, however, asymmetrical features have the added advantage of more easily agitating powder removal devices 109 thus initiating the removal of un-sintered and partially sintered powder 114.

Figure 4A:
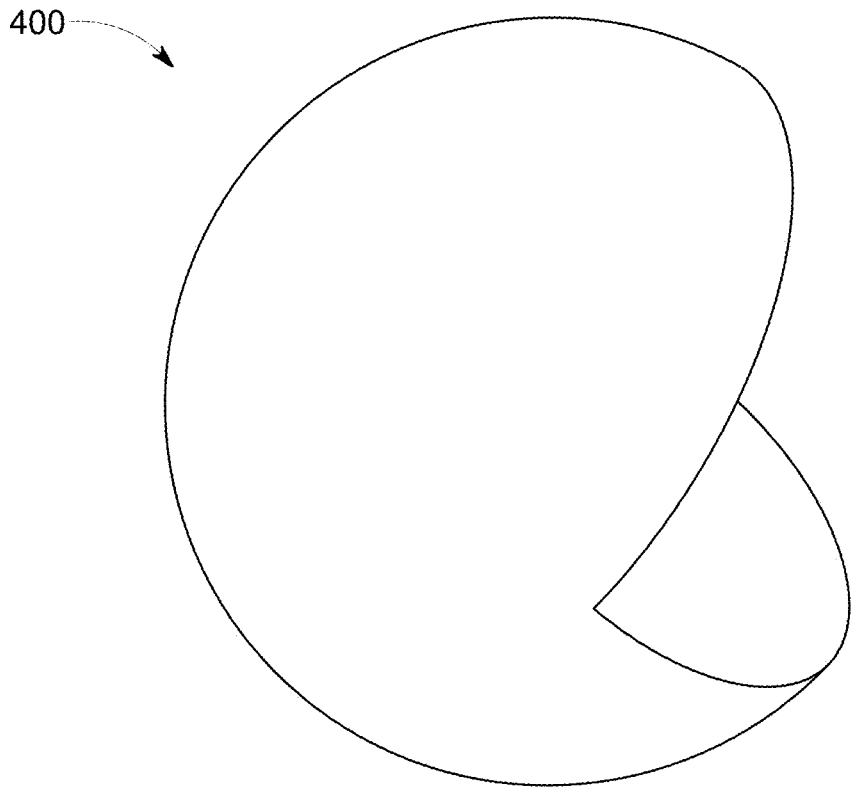
FIG. 4A is a perspective view of an exemplary powder removal device manufactured using an additive manufacturing system, such as the additive manufacturing system of FIG. 1.
Figure 4B:
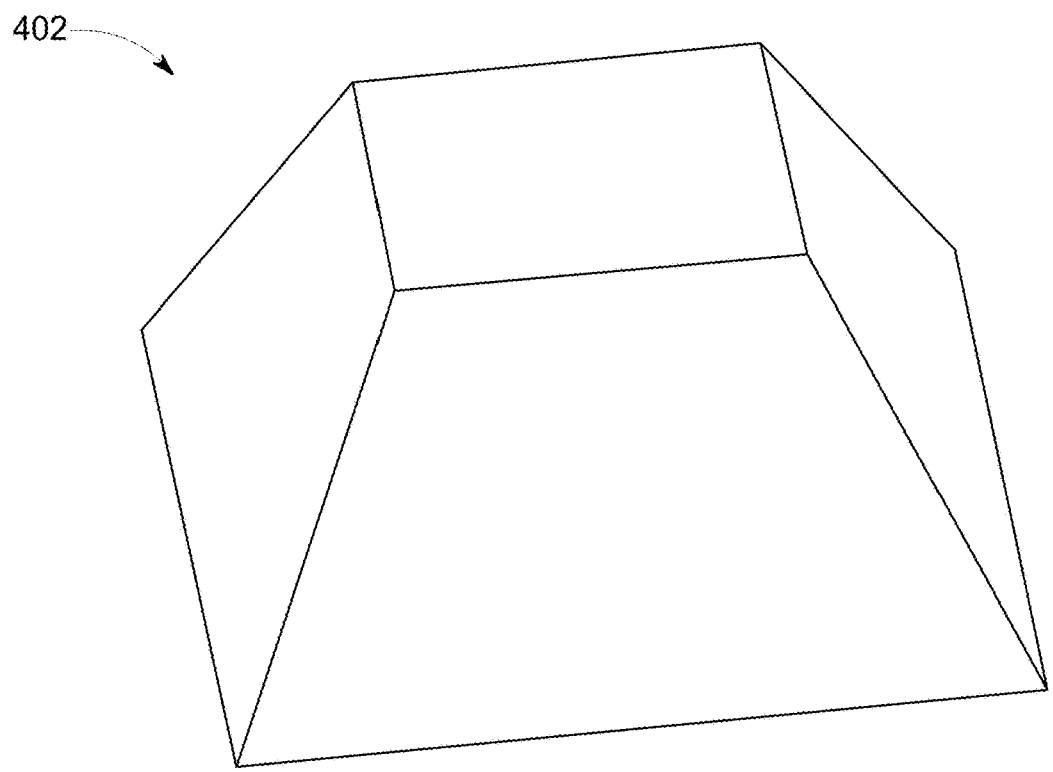
FIG. 4B is a perspective view of an alternative exemplary powder removal device manufactured using an additive manufacturing system, such as the additive manufacturing system of FIG. 1.
Figure 4C:
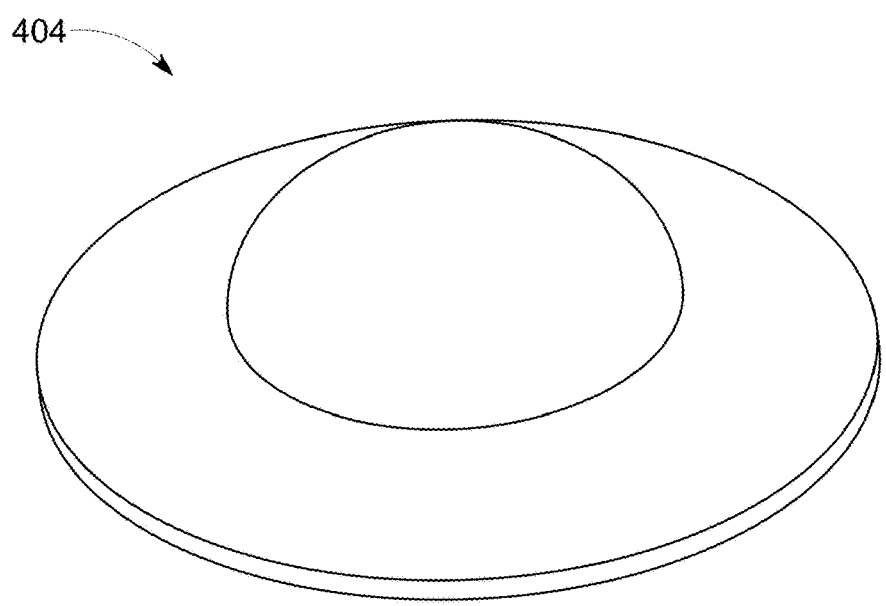
FIG. 4C is a perspective view of an alternative exemplary powder removal device manufactured using an additive manufacturing system, such as the additive manufacturing system of FIG. 1.
Figure 4D:
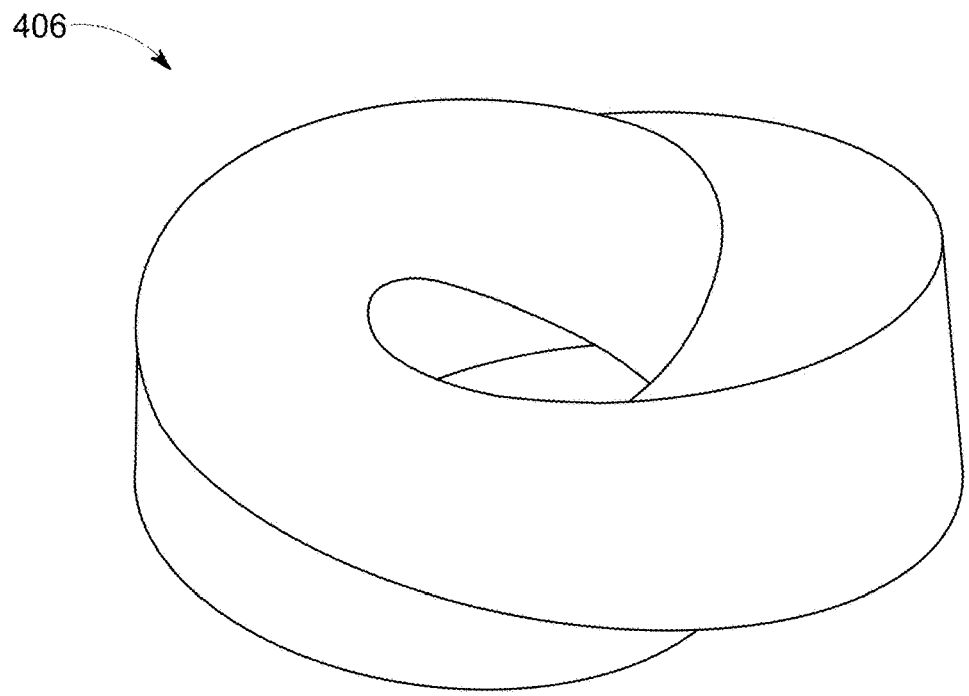
FIG. 4D is a perspective view of an alternative exemplary powder removal device manufactured using an additive manufacturing system, such as the additive manufacturing system of FIG. 1.
Figure 4E:
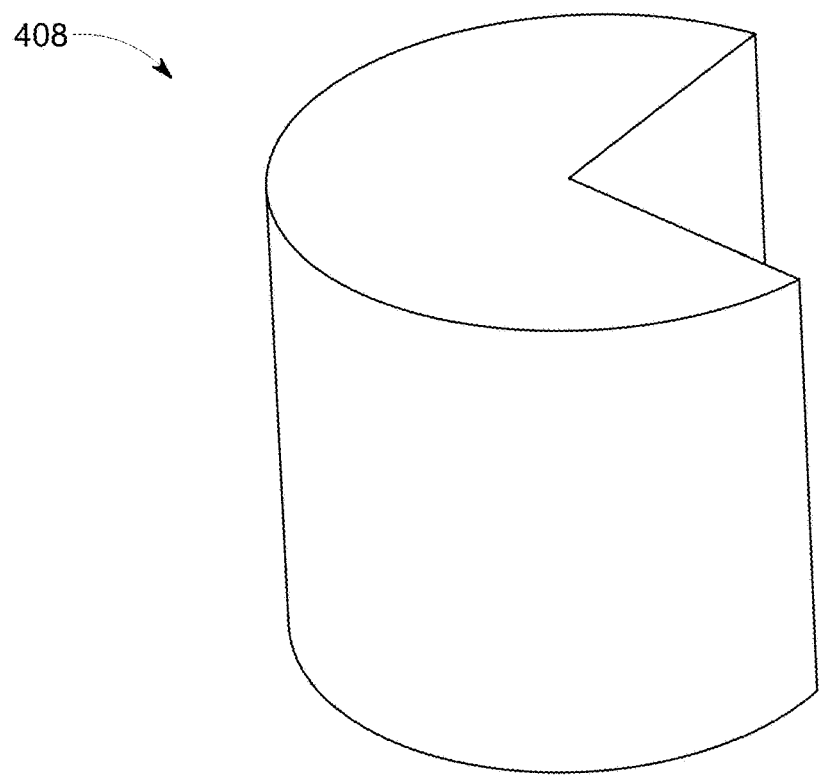
FIG. 4E is a perspective view of an alternative exemplary powder removal device manufactured using an additive manufacturing system, such as the additive manufacturing system of FIG. 1.
Figure 4F:
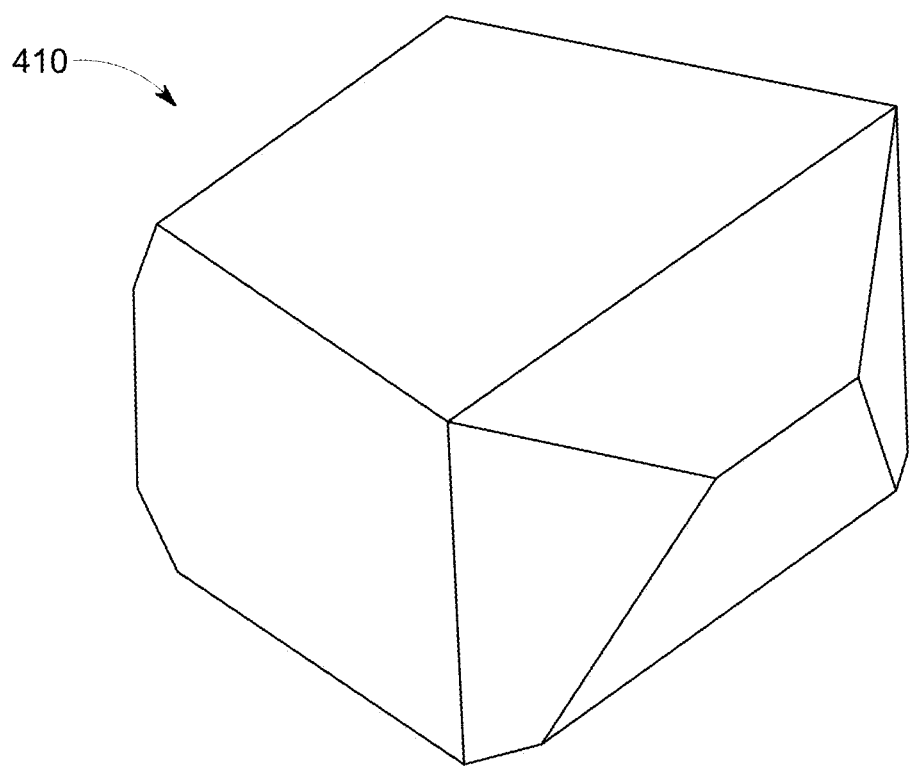
FIG. 4F is a perspective view of an alternative exemplary powder removal device manufactured using an additive manufacturing system, such as the additive manufacturing system of FIG. 1.

With reference to FIG. 4A, one exemplary powder removal device 400 has a spheroid shape. With reference to FIG. 4B, another exemplary powder removal device 402 has a prism shape. With reference to FIG. 4C, another exemplary powder removal device 404 has an ellipsoid shape combined with an annular disk shape. With reference to FIG. 4D, another exemplary powder removal device 406 has a Mobius loop shape. With reference to FIG. 4E, another exemplary powder removal device 408 has a cylindrical shape. With reference to FIG. 4F, another exemplary powder removal device 410 has a cuboid shape. Alternatively, powder removal devices 109 (shown in FIG. 1) may have any suitable shape.

Figure 5A:
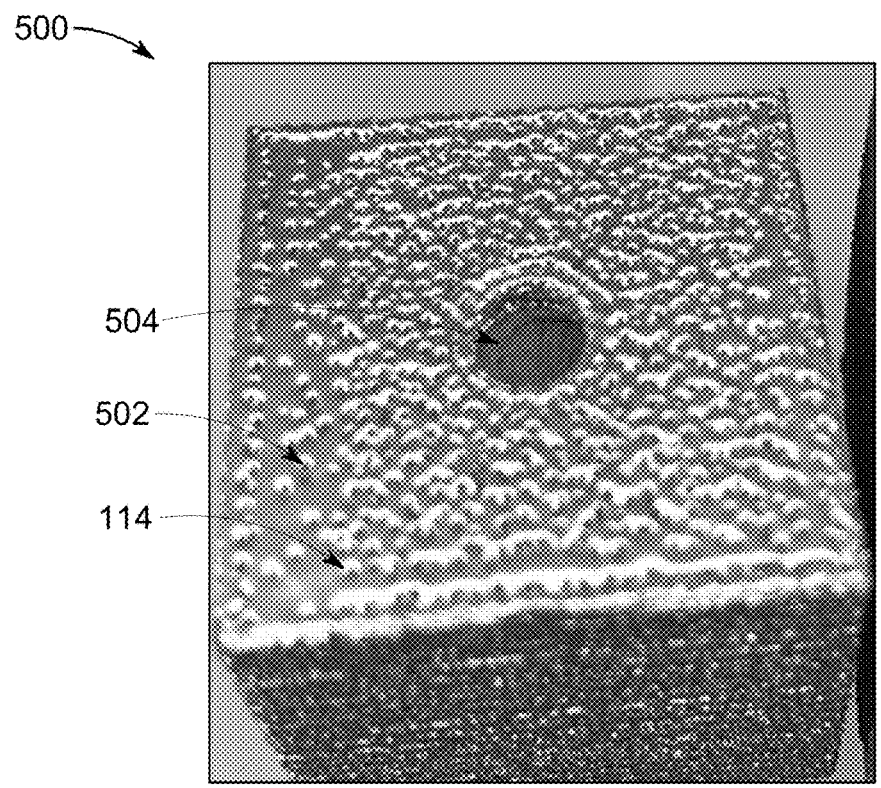
FIG. 5A is an image of a component prior to the powder removal process of FIG. 3.
Figure 5B:
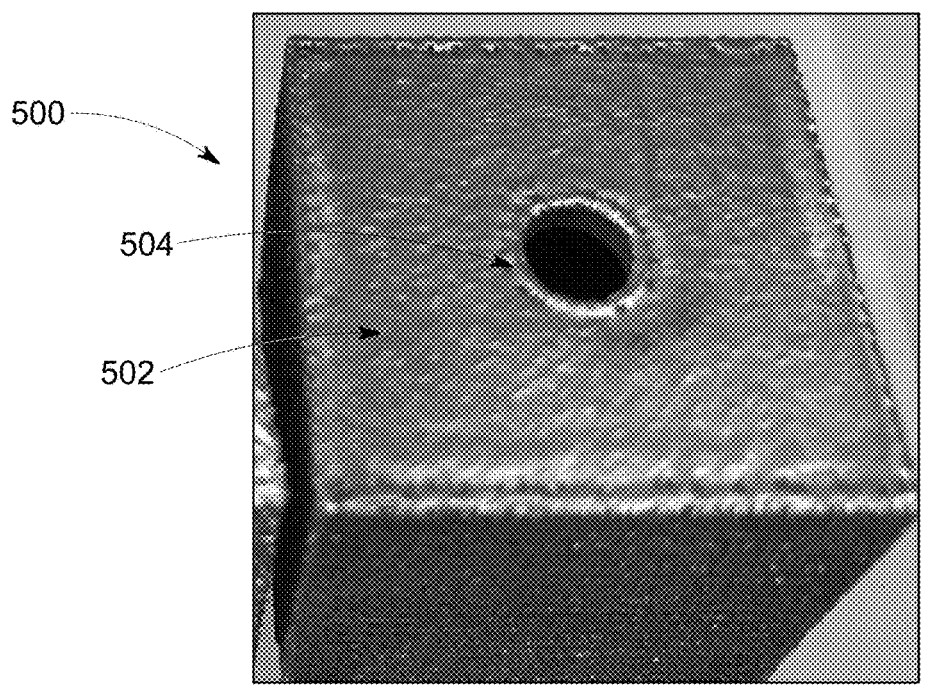
FIG. 5B is an image of the component of FIG. 5A having undergone the powder removal method of FIG. 3.

FIGS. 5A and 5B are images of a component 500 in a pre-processed and post-processed state, respectively. FIG. 5A shows a component 500 formed using method 200 (shown in FIG. 2). As a result of the EBM printing process, un-sintered and partially sintered powder 114 remains among the build layers 116 and on the surfaces of the printed part. This results in component 500 having a visibly rough exterior surface 502 and interior cavity 504. FIG. 5B shows component 500 after having undergone method 300 for removing un-sintered and partially sintered powder from printed component 500 using powder removal devices 109 (shown in FIG. 1). When compared to FIG. 5A, component 500 has a visibly smoother appearance on exterior surface 502 and interior cavity 504.

Figure 6:
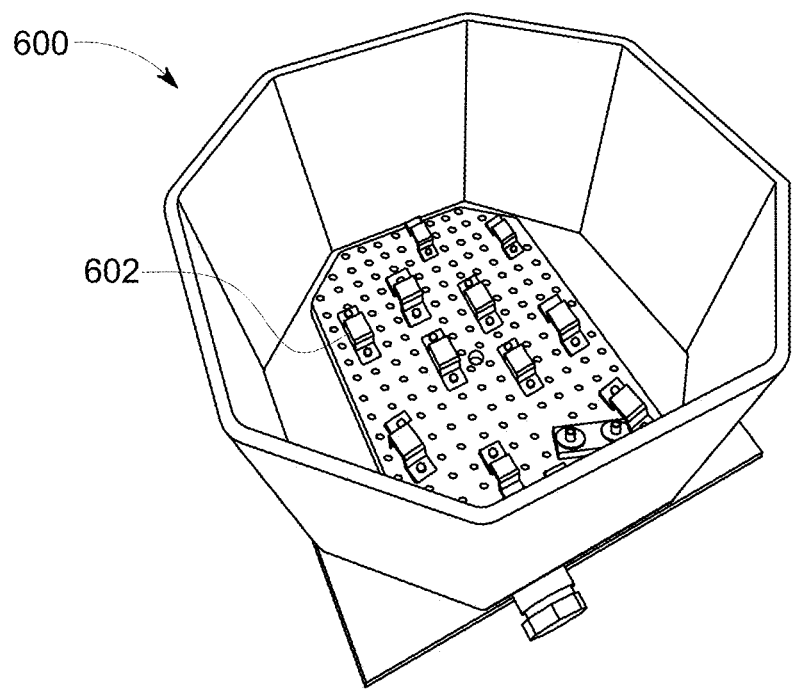
FIG. 6 is a perspective view of a vibratory bowl that can be used to implement the method of FIG. 3 to excite powder removal devices and remove powder from a component.

FIG. 6 is an image of a vibratory bowl 600 that may be used during method 300 (shown in FIG. 3) to excite powder removal devices 109 (shown in FIG. 1) and remove un-sintered and partially sintered powder 114 from within a component, such as component 102 (shown in FIG. 1), that has been manufactured using a method, such as method 200 (shown in FIG. 2). In the exemplary embodiment, vibratory bowl 600 can be configured to receive a component 102 and can be vibrated at a rate in the range from about 40 hertz to about 70 hertz. Additionally, or alternatively the interior of vibratory bowl 600 can have a fixed receptacle or possess a cushioned bed to receive component 102. Once component 102 is secured into vibratory bowl 600. A motor drives vibratory bowl 600 such that all un-sintered and partially sintered powder 114 exits component 102. Upon completion of the vibration, component 102 is removed from vibratory bowl 600 while the un-sintered and partially sintered powder remains in vibratory bowl 600.

The above-described embodiments overcome at least some disadvantages of known methods for removing un-sintered and partially sintered powder from components printed using additive manufacturing techniques. Specifically, the embodiments takes advantage of the additive manufacturing process by allowing for a powder removal tool to be integrated into the manufacture of the printed part by creating internal structures manufactured within the desired component during the printing process that when mechanically agitated, i.e, when excited by a vibratory tool such as a laboratory table or bowl, break apart the powder surrounding them, and egress their way out of the part through an exit port. The embodiments described herein provide a cost effective approach to evacuating un-sintered and partially sintered powder that remains after the printing process. Additionally, the embodiments can be applied to a wide range of designs, subsequently expanding the applicability and usefulness of high speed EBM printing by increasing the variety of parts an EBM machine is capable of printing. The embodiments can be applied to any additive manufacturing method, not just EBM, to facilitate clearing internal features of their powder or sintered material at a relatively low cost. The embodiments provides a cost effective way of removing un-sintered and partially sintered powder from the internal cavities and exterior surfaces of a printed part in a cost effective manner that does not require external processes i.e., abrasive blasting, pneumatics, or mechanical picking.

An exemplary technical effect of the methods, systems, and apparatus described herein includes at least one of: a) a cost effective approach to evacuating un-sintered and partially sintered powder that remains after the printing process, and b) a powder removal tool integrated into the manufacture of the printed part.

The methods, systems, and compositions disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only an additive manufacturing system as described herein. Rather, the methods, systems, and compositions may be implemented and utilized in connection with many other applications and additive manufacturing systems.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for forming a component from a powdered build material, the method comprising:
    creating a model of the component;
    creating a model of at least one powder removal device that is tethered to an adjacent surface of the component, wherein the at least one powder removal device has an ellipsoid shape combined with an annular disk shape;
    integrating the model of the at least one powder removal device into the model of the component;
    inputting the model of the component into an additive manufacturing system;
    operating the additive manufacturing system to build the component including the at least one powder removal device; and
    removing un-sintered and partially sintered material from an interior of the component using the at least one powder removal device.

2. The method according to claim 1, wherein creating a model of at least one power removal device comprises creating a model of at least one powder removal device that has a size between approximately 40 microns and approximately 100 microns.

3. The method according to claim 1, wherein removing un-sintered and partially sintered material from the component using the at least one powder removal device further comprises removing un-sintered and partially sintered material from the component out of at least one exit port defined in an exterior surface of the component.

4. The method according to claim 1, wherein the at least one powder removal device has an asymmetric geometry.

5. The method according to claim 1, wherein the at least one powder removal device is unattached to the component.

6. The method according to claim 1, the method further comprising:
    exciting the component prior to removing un-sintered and partially sintered material from the component using the at least one powder removal device.

7. The method according to claim 1, wherein creating a model of at least one powder removal device comprises creating a model of a plurality of powder removal devices.

8. The method according to claim 7, the method further comprising:
    interacting the plurality of powder removal devices with one another to facilitate breaking up un-sintered and partially sintered powder when the plurality of powder removal devices are excited.

9. A method for removing un-sintered and partially sintered powder from an additively manufactured part, the method comprising:
    fabricating, using an additive manufacturing process, a component including at least one powder removal device that is tethered to an adjacent surface of the component, wherein the at least one powder removal device has a cuboid shape; and
    exciting the component to cause the at least one powder removal device to remove un-sintered and partially sintered powder from the component.

10. The method according to claim 9, wherein the at least one powder removal device has an asymmetric geometry.

11. The method according to claim 9, wherein the at least one powder removal device is unattached to the component.

12. The method according to claim 9, wherein exciting the component comprises vibrating the component in a range from about 40 hertz to about 70 hertz.

13. The method according to claim 9, wherein exciting the component comprises exciting the component such that a structural integrity of the component is not compromised.

14. The method according to claim 9, wherein exciting the component comprises vibrating the component at a resonance frequency of the component.

15. The method according to claim 9, wherein exciting the component comprises vibrating the component at a vibration amplitude having an acceleration in a range from about 29.4 meters per second squared ($m/s^2$) to about 39.2 $m/s^2$.

16. The method according to claim 9, wherein exciting the component comprises vibrating the component at a vibrational amplitude having a displacement in a range from about 0.0254 millimeter (mm) to about 0.127 mm inches.

17. The method according to claim 9, wherein the at least one powder removal device comprises a plurality of powder removal devices arranged in relation to one another, and wherein the method further comprises:

interacting the plurality of powder removal devices with one another to facilitate breaking up un-sintered and partially sintered powder when the plurality of powder removal devices are excited.

18. The method according to claim 9, the method further comprising:

removing un-sintered and partially sintered material from the component using the at least one powder removal device further comprises removing un-sintered and partially sintered material from the component out of at least one exit port defined in an exterior surface of the component.

* * * * *